(12) United States Patent
Morichika

(10) Patent No.: US 7,633,654 B2
(45) Date of Patent: Dec. 15, 2009

(54) CAMERA, COMPUTER AND PROJECTOR FOR USE IN SENSED IMAGE PROJECTION SYSTEM FOR PROJECTING THE IMAGE OF A PROJECTION TARGET ONTO A SCREEN, AND IMAGE PROCESSING METHOD

(75) Inventor: Kazumasa Morichika, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 940 days.

(21) Appl. No.: 10/952,464

(22) Filed: Sep. 28, 2004

(65) Prior Publication Data
US 2005/0068419 A1   Mar. 31, 2005

(30) Foreign Application Priority Data
Sep. 30, 2003   (JP) .............................. 2003-341861

(51) Int. Cl.
*H04N 1/04*   (2006.01)
(52) U.S. Cl. ........................ 358/474; 358/471; 358/472; 358/473
(58) Field of Classification Search ................ 358/474, 358/471, 472, 473, 475, 509, 510, 505, 448, 358/506, 451, 452, 453, 464; 353/100, 101; 355/44; 382/275
See application file for complete search history.

(56) References Cited

U.S. PATENT DOCUMENTS

| | | | |
|---|---|---|---|
| 4,956,664 A * | 9/1990 | Hasegawa et al. ............. | 355/44 |
| 5,337,164 A | 8/1994 | Yabe et al. | |
| 5,467,198 A * | 11/1995 | Aosaki et al. ................ | 358/474 |
| 5,568,279 A * | 10/1996 | Hinman et al. ............... | 358/452 |
| 5,757,519 A * | 5/1998 | Yoo ............................ | 358/475 |
| 5,760,925 A * | 6/1998 | Saund et al. ................. | 358/474 |
| 6,195,131 B1 | 2/2001 | Kaneko | |
| 6,317,221 B1 | 11/2001 | Aikawa et al. | |
| 6,388,654 B1 | 5/2002 | Platzker et al. | |
| 6,961,165 B2 * | 11/2005 | Uehara ....................... | 353/100 |
| 7,046,401 B2 * | 5/2006 | Dufaux et al. ............... | 382/275 |

(Continued)

FOREIGN PATENT DOCUMENTS

JP   06-178190 A   6/1994

(Continued)

OTHER PUBLICATIONS

Japanese Office Action dated Dec. 11, 2007 issued in counterpart Japanese Application.

*Primary Examiner*—Houshang Safaipour
(74) *Attorney, Agent, or Firm*—Frishauf, Holtz, Goodman & Chick, P.C.

(57) ABSTRACT

A computer acquires the aspect ratio of an image and the aspect ratio of the display of a monitor and compares the aspect ratios with each other. With the aspect ratio of the monitor display taken as a reference, the computer determines which one of the vertical length and the horizontal length of the image is longer. The computer sets the magnification of the image based on the decision result in such a way that one of the vertical size and the horizontal size of the image matches with or becomes slightly smaller than the frame of the monitor display, and enlarges or reduces the image. The computer outputs data of the size-adjusted image to a projector.

20 Claims, 12 Drawing Sheets

U.S. PATENT DOCUMENTS

| | | | |
|---|---|---|---|
| 7,075,685 B2 * | 7/2006 | Chen et al. | 358/474 |
| 7,317,557 B2 * | 1/2008 | Pollard et al. | 358/448 |
| 2002/0191232 A1 * | 12/2002 | Orozco | 358/506 |
| 2006/0279804 A1 * | 12/2006 | Ishikawa et al. | 358/474 |

FOREIGN PATENT DOCUMENTS

| | | | |
|---|---|---|---|
| JP | 06-303488 A | | 10/1994 |
| JP | 07-298225 A | | 11/1995 |
| JP | 09-069988 A | | 3/1997 |
| JP | 11-252454 A | | 9/1999 |
| JP | 2002-207247 | * | 7/2002 |
| JP | 2002-354331 A | | 12/2002 |
| WO | WO-01/09836 | * | 2/2001 |
| WO | WO 01/09836 A1 | | 2/2001 |

\* cited by examiner

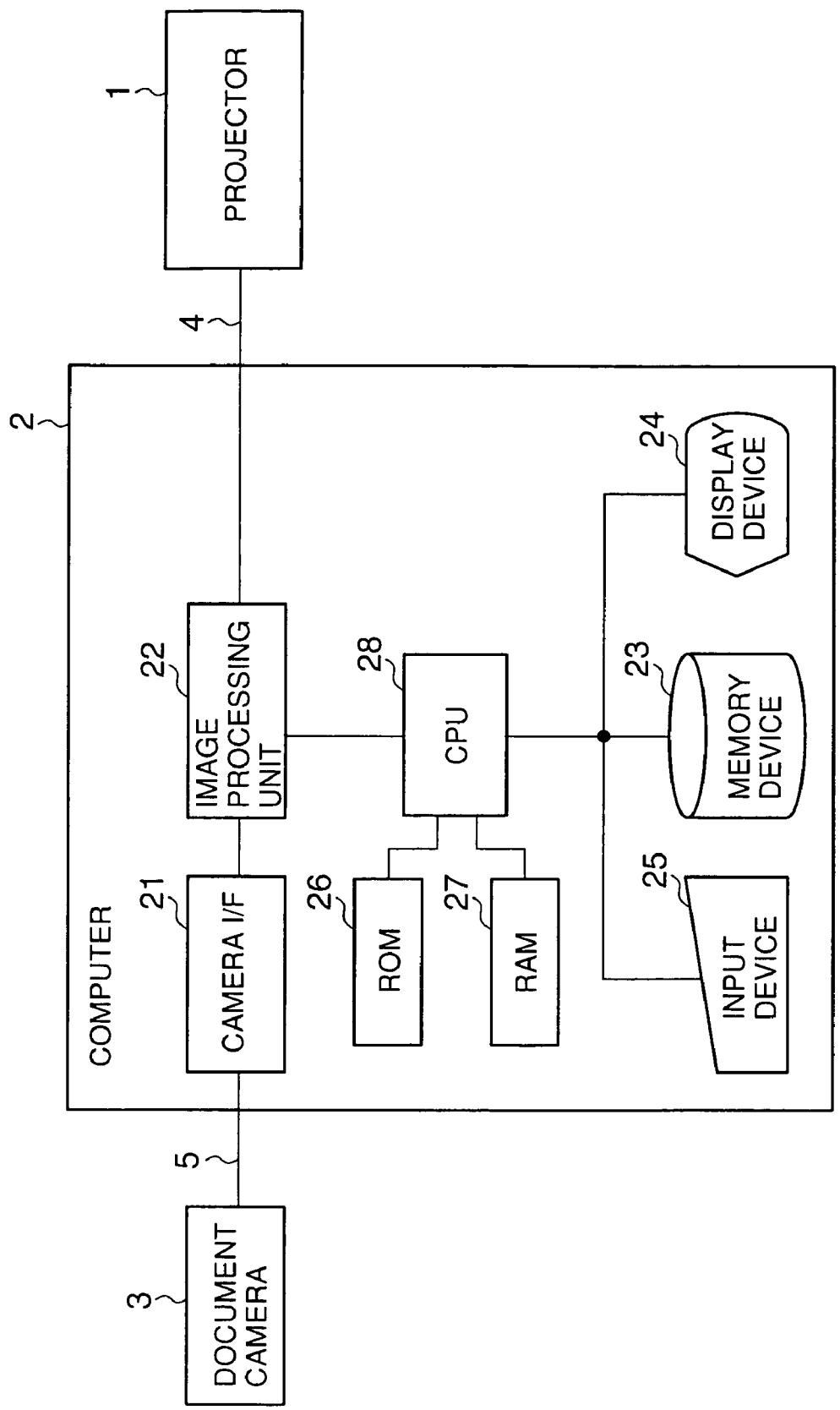

FIG. 3

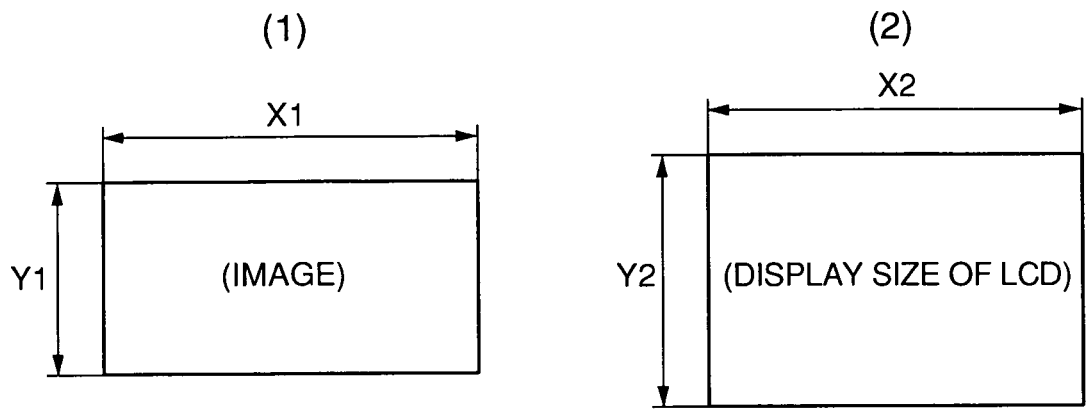

X1: LENGTH OF THE HORIZONTAL SIDE OF IMAGE
Y1: LENGTH OF THE VERTICAL SIDE OF IMAGE
X2: LENGTH OF THE HORIZONTAL SIDE OF (DISPLAY SIZE OF) LCD
Y2: LENGTH OF THE VERTICAL SIDE OF (DISPLAY SIZE OF) LCD (a) $\frac{X1}{Y1} < \frac{X2}{Y2}$   MATCH THE LENGTH OF THE VERTICAL SIDE OF IMAGE WITH THE LENGTH OF THE VERTICAL SIDE OF LCD   →   $m = \frac{Y2}{Y1}$ (b) $\frac{X1}{Y1} = \frac{X2}{Y2}$   MATCH THE LENGTH OF THE VERTICAL SIDE OF IMAGE WITH THE LENGTH OF THE VERTICAL SIDE OF LCD   →   $m = \frac{Y2}{Y1}$ (c) $\frac{X1}{Y1} > \frac{X2}{Y2}$   MATCH THE LENGTH OF THE HORIZONTAL SIDE OF IMAGE WITH THE LENGTH OF THE HORIZONTAL SIDE OF LCD   →   $m = \frac{X2}{X1}$ BACKGROUND PORTION WHEN $\frac{X1}{Y1} < \frac{X2}{Y2}$ BACKGROUND PORTION WHEN $\frac{X1}{Y1} > \frac{X2}{Y2}$

CAMERA, COMPUTER AND PROJECTOR FOR USE IN SENSED IMAGE PROJECTION SYSTEM FOR PROJECTING THE IMAGE OF A PROJECTION TARGET ONTO A SCREEN, AND IMAGE PROCESSING METHOD

BACKGROUND OF THE INVENTION

1. Field of the Invention

The present invention relates to a sensed image projection apparatus, an image processing method and a program.

2. Description of the Related Art

There is a sensed image projection apparatus which projects the image of a document obtained by sensing the document, placed on a document table, with a computer by a user and then storing data of the sensed image in a memory device in a computer and performing image processing on the image data (see, for example, Japanese Patent Application KOKAI Publication No. 2002-354331 (pages 2 and 3 and FIG. 1)).

Because of various sheet sizes of documents present, however, a part of a document may be lost or the margin may become large, providing a poor appearance, unless the document should be sensed by the adequate magnification.

Accordingly, it is an object of the invention to provide a camera, a computer and a projector which are to be used in a sensed image projection system capable of displaying an easy-to-see image, and an sensed image processing method.

SUMMARY OF THE INVENTION

According to one aspect of the invention, there is provided a camera for use in a sensed image projection system for projecting an image of a sensed projection target onto a screen, comprising:

an image pickup lens;

a sensing element;

an image processing unit which enlarges or reduces the image of the projection target by a magnification at which one of a vertical size and a horizontal size of the image of the projection target corresponds to a predetermined shape corresponding to an image projection frame of the screen, in such a way that the image of the projection target obtained by sensing the projection target is entirely displayed within the predetermined shape; and an output unit which outputs an image subjected to image processing by the image processing unit as an image to be projected onto the screen.

According to the second aspect of the invention, there is provided a computer for use in a sensed image projection system, comprising:

an input unit to which an image obtained by sensing a projection target is input;

an image processing unit which enlarges or reduces the image of the projection target by a magnification at which one of a vertical size and a horizontal size of the image of the projection target corresponds to a predetermined shape corresponding to an image projection frame of the screen, in such a way that the image of the projection target is entirely displayed within the predetermined shape; and a control unit which outputs an image subjected to image processing by the image processing unit to a projection unit for projecting the image onto the screen.

According to the third aspect of the invention, there is provided a projector for use in a sensed image projection system for projecting an image of a projection target onto a screen, comprising:

a projection lens;

a light bulb which forms an image;

an interface to which image data is input; and an image processing unit which enlarges or reduces the image of the projection target by a magnification at which one of a vertical size and a horizontal size of the image of the projection target corresponds to a predetermined shape corresponding to an image projection frame of the screen, in such a way that the image of the projection target input from the interface is entirely displayed within the predetermined shape, whereby an image subjected to image processing by the image processing unit is projected onto the screen by the light bulb and the projection lens.

According to the fourth aspect of the invention, there is provided an image processing method for performing image processing on an image of a projection target to be projected onto a screen, comprising the steps of:

setting a magnification at which one of a vertical size and a horizontal size of the image of the projection target corresponds to a predetermined shape corresponding to an image projection frame of the screen, in such a way that the image of the projection target is entirely displayed within the predetermined shape; and enlarging or reducing the image of the projection target by the set magnification.

According to the fifth aspect of the invention, there is provided a recording medium having recorded a program which allows a computer to execute:

a step of generating an image of a projection target by extracting the image of the projection target from an image including the projection target, sensed by an image sensing device;

a step of setting a magnification at which one of a vertical size and a horizontal size of the image of the projection target corresponds to a predetermined shape corresponding to an image projection frame of the screen, in such a way that the image of the projection target is entirely displayed within the predetermined shape; and a step of enlarging or reducing the image of the projection target by the set magnification.

According to any aspect, the image of a projection target is laid out as large as possible and without being partly lost within a predetermined shape and can be projected in an easy-to-see manner.

BRIEF DESCRIPTION OF THE DRAWINGS

These objects and other objects and advantages of the present invention will become more apparent upon reading of the following detailed description and the accompanying drawings in which:

FIG. 2 is a block diagram showing the structure of a computer shown in FIG. 1;

FIG. 3 is an explanatory diagram illustrating the aspect ratio of an image with the aspect ratio of a projector;

DETAILED DESCRIPTION OF THE PREFERRED EMBODIMENT

A sensed image projection apparatus according to one embodiment of the invention will be described below with reference to the accompanying drawings.

Figure 1:
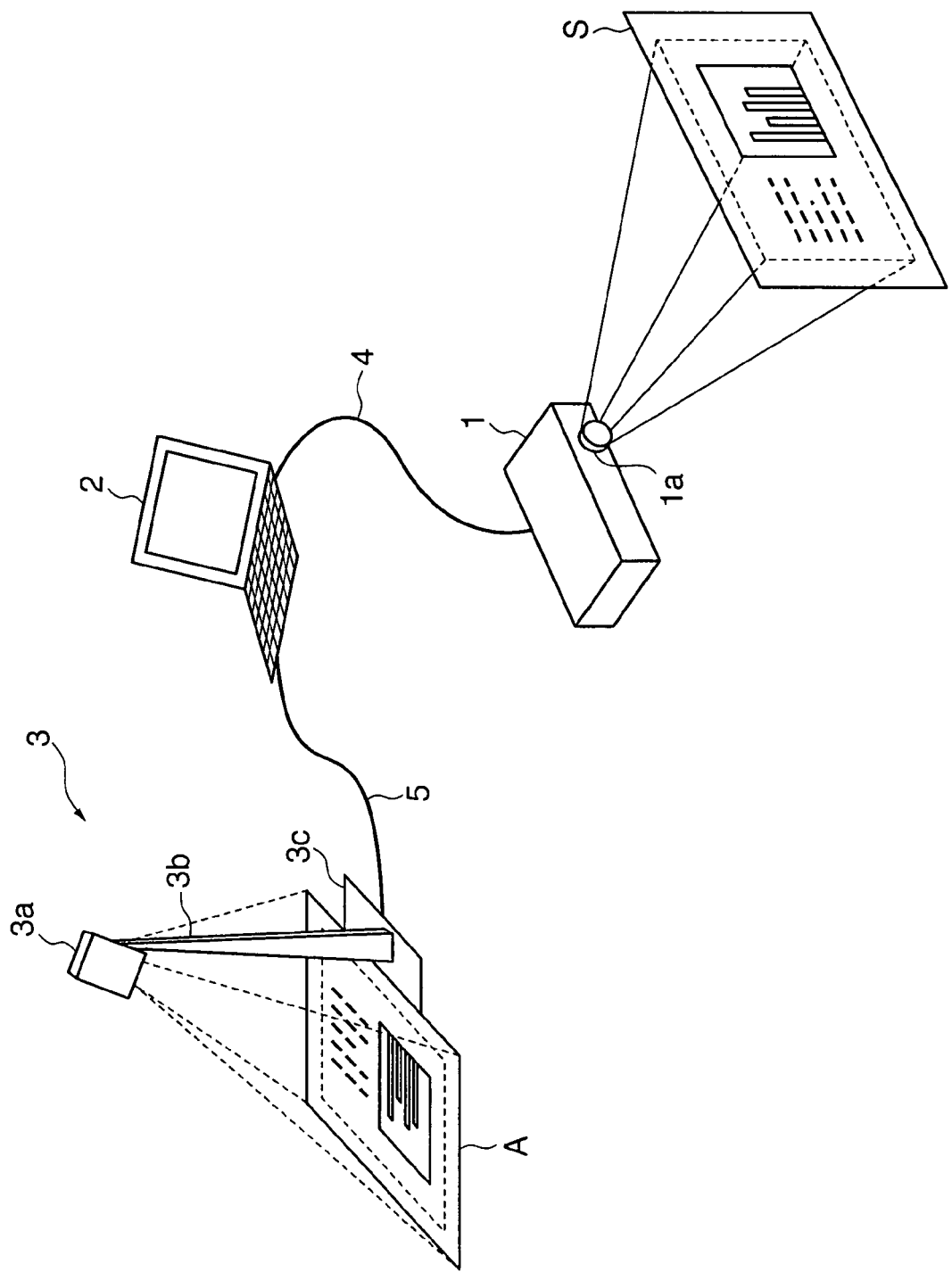
FIG. 1 is a diagram showing the structure of an sensed image projection apparatus according to one embodiment of the invention.

FIG. 1 shows the structure of the sensed image projection apparatus according to the embodiment.

The sensed image projection apparatus includes a projector 1, a computer 2, and a document camera 3.

The projector 1 and the computer 2 are connected together by an RGB cable 4. The computer 2 and the document camera 3 are connected together by a USB cable 5.

The projector 1 receives image data corresponding to a document material A as an original or a document (projection target) and projects an image based on the received image data onto a screen S. The projector 1 has an optical system 1a at the front of the body. The optical system 1a retains a projection lens, etc., and the projector 1 irradiates light a document or an image onto the screen S via the optical system 1a.

The computer 2 shown in FIG. 1, constructed by, for example, a notebook type personal computer, runs various programs. When a user selects a document camera function, the computer 2 acquires the image data of the document material A sensed by a camera 3a of the document camera 3, performs image processing or so on the image data, and supplies the resultant image data to the projector 1.

As shown in FIG. 2, the computer 2 includes a camera interface (I/F) 21, an image processing unit 22, a memory device 23, a display device 24, an input device 25, a ROM (Read Only Memory) 26, a RAM (Random Access Memory) and a CPU (Central Processing Unit) 28.

The camera I/F 21 receives image data or so from the document camera 3.

The image processing unit 22 performs image processing on the image data received by the camera I/F 21. The image processing unit 22 converts the image of image data to a rectangular image, rotates an image, extracts an image and enlarges or reduces an image as the image processing.

The image processing unit 22 may be accomplished by hardware or image processing software.

The memory device 23 stores image data subjected to image processing by the image processing unit 22, and is comprised of a hard disk or so. The image data is the image data of an image to be projected onto the screen S by the projector 1.

The memory device 23 saves image information about the image data together with the image data as an image file. The image information includes the date on which the document material A is sensed, the sensing time, the projection time, the exposure condition, image data of a preview form, and other sensing conditions.

The display device 24, which displays images before and after image processing, performed by the image processing unit 22, on a monitor, includes an LCD (Liquid Crystal Display) for displaying an image on the monitor and a drive circuit for the LCD.

The display size of the LCD of the display device 24 is given by the length of the vertical side×the length of the horizontal side. In the embodiment, the screen shape of the LCD of the display device 24 is the display frame of the monitor or a "predetermined shape". The "predetermined shape" is similar to the shape of projection light of the projector 1, and is stored in the ROM 26 beforehand, or stored as an arbitrary value in the RAM 27 by the user. According to the embodiment, the aspect ratio of the LCD corresponds in one-to-one to the aspect ratio of the shape of projection light of the projector 1 or the image projection frame on the screen S. When data of image displayed in the LCD is output to the projector 1, therefore, the image is displayed in the image projection frame on the screen S.

The input device 25, which is used by the user to input data, has a plurality of keys for data entry and a mouse (not shown). When the user operates the keys and the mouse of the input device 25, the input device 25 supplies information of the operation performed by the user to the CPU 28.

The ROM 26 stores programs or so that the CPU 28 execute. The RAM 27 is a work memory to store data necessary for the CPU 28 to run a program.

The CPU 28 controls the individual sections of the computer 2, the document camera 3 and the projector 1 according to the programs stored in the ROM 26.

The CPU 28 compares the aspect ratio of the image of the document material A, subjected to image extraction by the image processing unit 22, with the aspect ratio of the LCD of the display device 24, and discriminates the side of the image that corresponds to the LCD based on the comparison result. The CPU 28 sets the magnification based on the ratio of the length of the side discriminated to correspond to the LCD to the length of the side that corresponds to the LCD. The CPU 28 sets the magnification in such a way that one of the vertical size and the horizontal size of the image of the document material A matches with or smaller than the monitor display frame.

The process will be discussed below more specifically. The CPU 28 compares the aspect ratio (X1/Y1) of an image as shown in (a) in FIG. 3 with the aspect ratio (X2/Y2) of the LCD of the display device 24 as shown in (b) in FIG. 3 or the aspect ratio of a predetermined shape. Provided that the aspect ratio (X2/Y2) does not change, the CPU 28 determines which one of the vertical side of the image (length: Y1) in this case and the horizontal side (length: X1) is longer.

When the aspect ratio (X1/Y1) of the image is less than the aspect ratio (X2/Y2) of the LCD, for example, the CPU 28 decides that the vertical side of the image is longer than the horizontal side. With the decision made, the CPU 28 sets a magnification m to enlarge or reduce the image to (Y2/Y1). The CPU 28 supplies the set magnification m to the image processing unit 22, which in turn performs an image enlarging or reducing process using the supplied magnification m.

The document camera 3 shown in FIG. 1 is a camera system for sensing the document material A as a projection target, and includes the camera 3a, a column 3b and a camera stand 3c. The camera 3a is a digital camera which senses the document material A as a subject and outputs image data of the sensed document material A. The camera 3a is attached to the upper end portion of the column 3b in such a way as to be rotatable vertically and sideways. The camera stand 3c supports the column 3b and also serves as a stand on which the document material A, such as newspaper, a magazine article, a presentation sheet or a sheet of a document, is placed.

The operation of the sensed image projection apparatus according to the embodiment will be described next.

Figure 4:
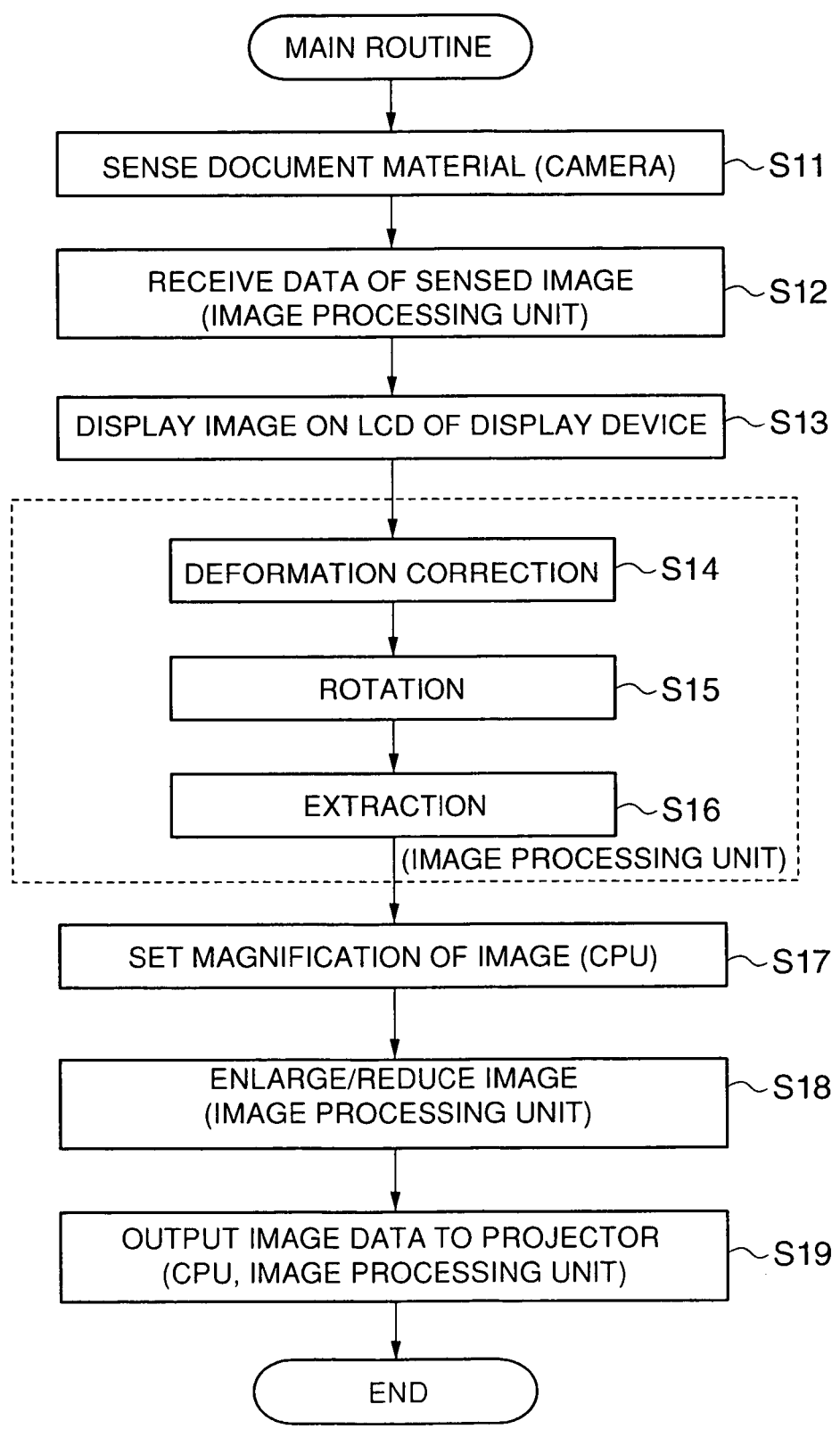
FIG. 4 is a flowchart illustrating a main routine of a document camera function which is executed by the sensed image projection apparatus shown in FIG. 1.

The sensed image projection apparatus executes the main routine of the document camera function according to a flowchart illustrated in FIG. 4.

The camera 3a senses the document material A, such as a document, placed on the camera stand 3c (step S11).

The image processing unit 22 receives image data of the sensed document material A from the document camera 3 via the camera I/F 21 (step S12).

The display device 24 displays the image of the received image data on the LCD under the control of the CPU 28 (step S13).

The image processing unit 22 performs deformation correction on the received image data (step S14).

The image processing unit 22 executes rotation of the image data undergone the deformation correction process (step S15).

Figure 5A:
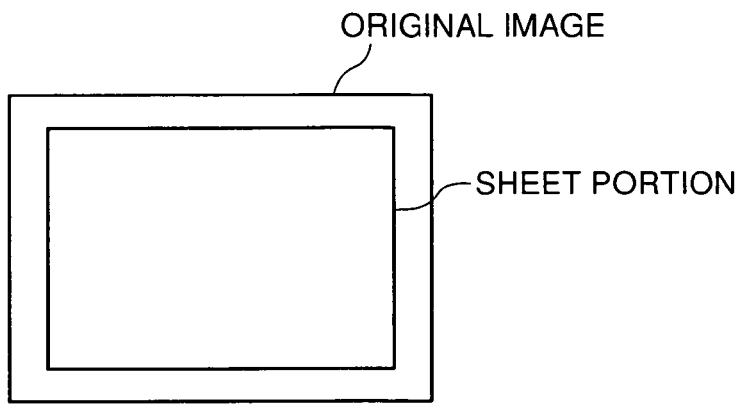
FIGS. 5A to 5D are explanatory diagrams of an image extraction routine which is executed by the computer shown in FIG. 1.
Figure 5B:
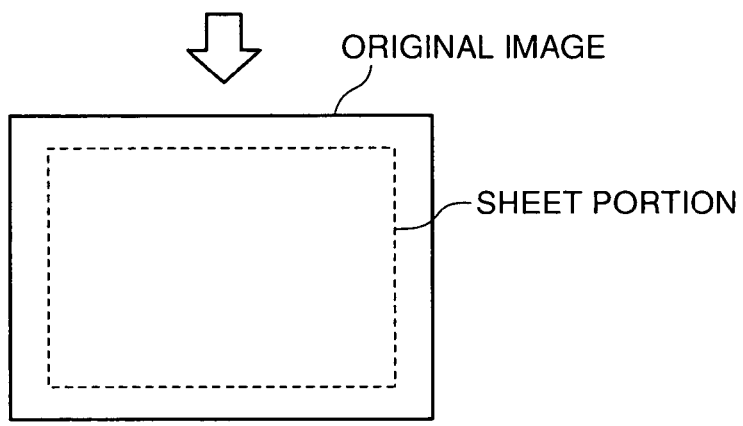
Figure 5C:
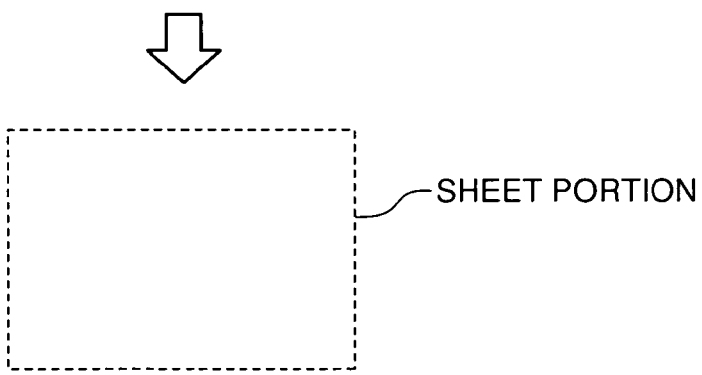

The image processing unit 22 executes extraction of the image data undergone the rotation process (step S16). Specifically, the image processing unit 22 discriminates a sheet portion of the document material A as shown in FIG. 5B from the original image as shown in FIG. 5A, and extracts the discriminated sheet portion of the document material A as shown in FIG. 5C. The extracted sheet portion is the image size.

Figure 5D:
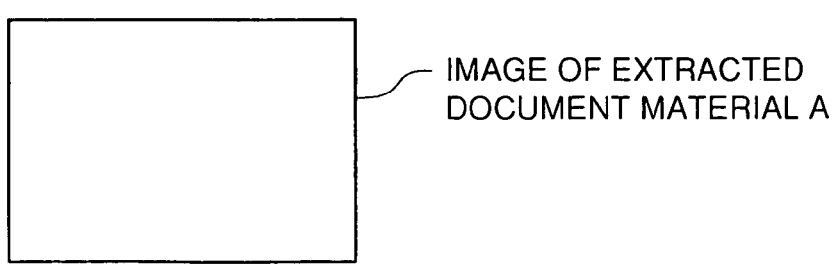
Figure 6:
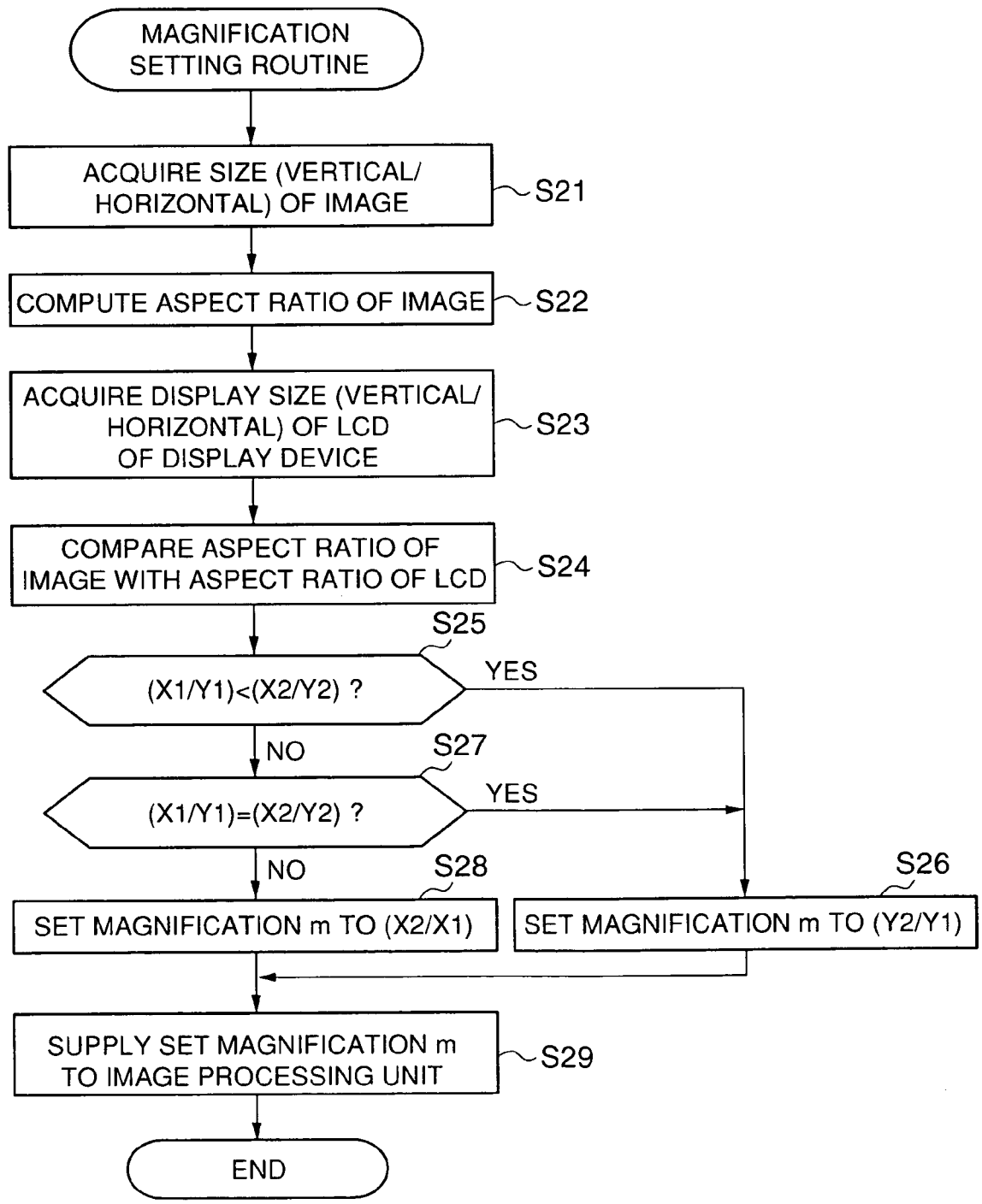
FIG. 6 is a flowchart illustrating the contents of a magnification setting routine which is executed by the computer shown in FIG. 1.

The CPU 28 receives image data as shown in FIG. 5D extracted by the image processing unit 22 and sets the magnification for enlarging or reducing the image according to a flowchart shown in FIG. 6 (step S17).

The CPU 28 acquires the image size from the image processing unit 22 (step S21). The CPU 28 computes the aspect ratio of the image from the acquired image size (step S22).

The CPU 28 acquires the display size and the aspect ratio of the LCD of the display device 24 (step S23).

The CPU 28 compares the aspect ratio (X1/Y1) of the image with the aspect ratio (X2/Y2) of the LCD (step S24).

The CPU 28 determines whether the aspect ratio (X1/Y1) of the image is less than the aspect ratio (X2/Y2) of the LCD or not (step S25).

Figure 7A:
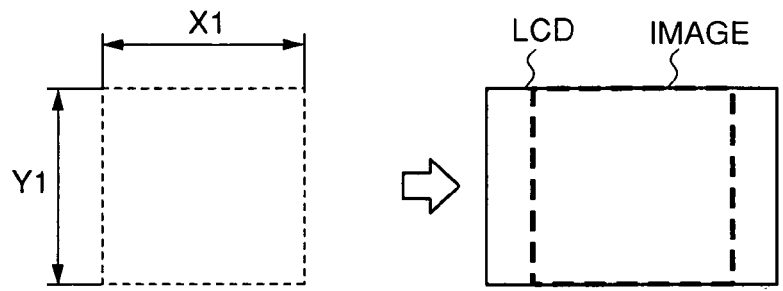
FIGS. 7A to 7C are explanatory diagrams illustrating the contents of an image-size adjusting routine which is executed by the computer shown in FIG. 1.
Figure 7B:
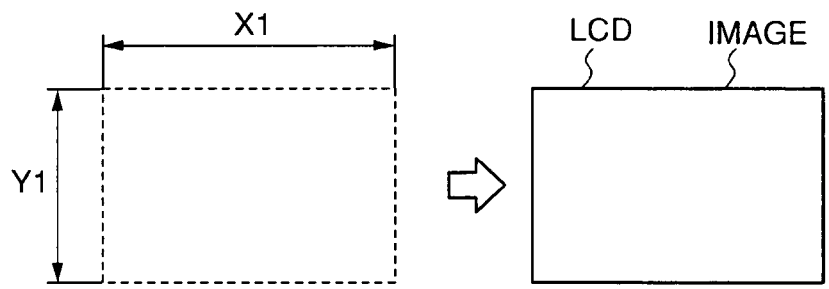
Figure 7C:
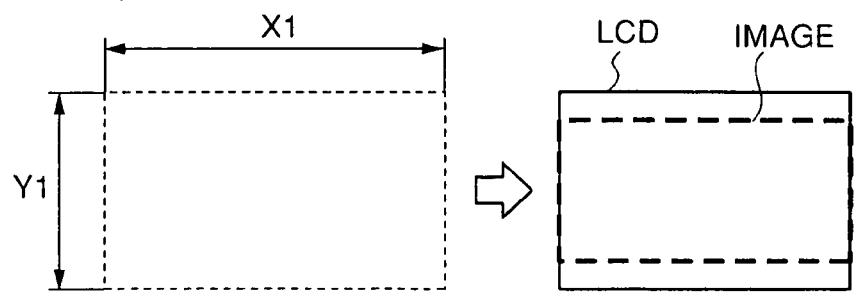

Provided that the aspect ratio (X2/Y2) of the LCD does not change, if (X1/Y1)<(X2/Y2) as shown in FIG. 7A, the vertical side (length: Y1) of the image is longer than the horizontal side (length: X1) of the image. When it is determined that (X1/Y1)<(X2/Y2) (YES at step S25), therefore, the CPU 28 sets the magnification m to (Y2/Y1) in such a way that the length Y1 of the vertical side matches with the length Y2 of the corresponding side of the LCD (step S26). Alternatively, the CPU 28 set the magnification m to a value slightly smaller than (Y2/Y1).

When it is not determined that (X1/Y1)<(X2/Y2) (NO at step S25), the CPU 28 determines whether the aspect ratio (X1/Y1) of the image is equal to the aspect ratio (X2/Y2) of the LCD or not (step S27).

When it is determined that (X1/Y1)=(X2/Y2) (YES at step S27), the CPU 28 sets the magnification m to (Y2/Y1) (step S26). Alternatively, the CPU 28 set the magnification m to a value slightly smaller than (Y2/Y1).

When (X1/Y1)≠(X2/Y2), on the other hand, (X1/Y1)>(X2/Y2) in which case the horizontal side of the image is longer than the vertical side. When it is determined that (X1/Y1)≠(X2/Y2) (NO at step S27), therefore, the CPU 28 sets the magnification m to (X2/X1) in such a way that the length X1 of the vertical side matches with the length X2 of the corresponding side of the LCD (step S28). Alternatively, the CPU 28 set the magnification m to a value slightly smaller than (X2/X1).

The CPU 28 supplies the set magnification to the image processing unit 22 (step S29).

The image processing unit 22 enlarges or reduces the image based on the magnification m supplied from the CPU 28 (step S18 in FIG. 4). At this time, the image processing unit 22 performs image processing in such a way that the center position of the image coincides with the center position of the LCD.

The CPU 28 controls the image processing unit 22 in such a way that the image data undergone image processing is output to the projector 1 (step S19). The image of the document material A sensed by the camera 3a is corrected and displayed on the screen S this way.

According to the embodiment, as apparent from the above, based on the result of comparison of the aspect ratio of the image of the document material A with the aspect ratio of the monitor display frame, the CPU 28 sets the magnification in such a way that the image of the document material A is fitted in the monitor display frame. The magnification is set in such a way that one of the vertical size and the horizontal size of the image of the document material A matches with or smaller than the monitor display frame. The image processing unit 22 enlarges or reduces the image of the document material A by the magnification.

Therefore, the sensed image of the document material A is displayed on the LCD of the display device 24 without being partly lost, and the image displayed on the LCD can be displayed on the screen S in an easy-to-see manner.

As the image processing unit 22 performs image processing in such a way that only the sheet portion of the image sensed by the document camera 3 is positioned in the center of an image to be projected by the projector 1, the image of the document material A can be displayed with the maximum size.

Figure 8:
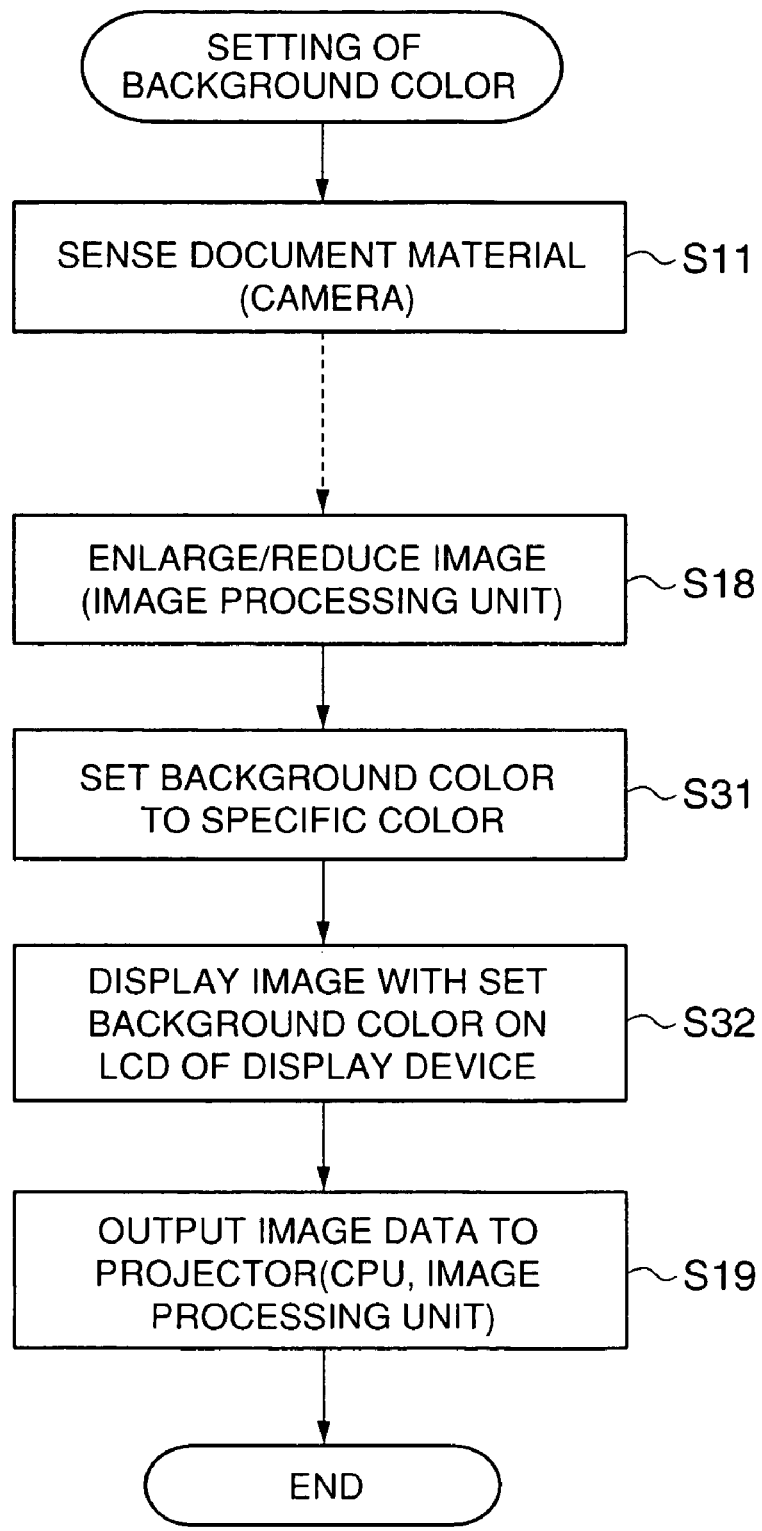
FIG. 8 is a flowchart illustrating the contents of a process of the computer shown in FIG. 1 of setting a background color to a specific color.

If the aspect ratio of the image of the document material A does not coincide with the aspect ratio of the LCD of the display device 24 at the time the image of image data is displayed on the display device 24, a sheet margin is produced between the monitor display frame and the image of the document material A. With the margin as the background portion, the color of the background portion can be set to a specific color. A flowchart for a routine for this color setting is illustrated in FIG. 8.

After the image processing unit 22 enlarges or reduces an image (step S18), the CPU 28 sets the display color of the background portion on the monitor of the display device 24 to black as a specific color (step S31).

Then, the CPU 28 sends the image data to the display device 24 which in turn displays an image with the background color on the LCD (step S32).

Figure 9A:
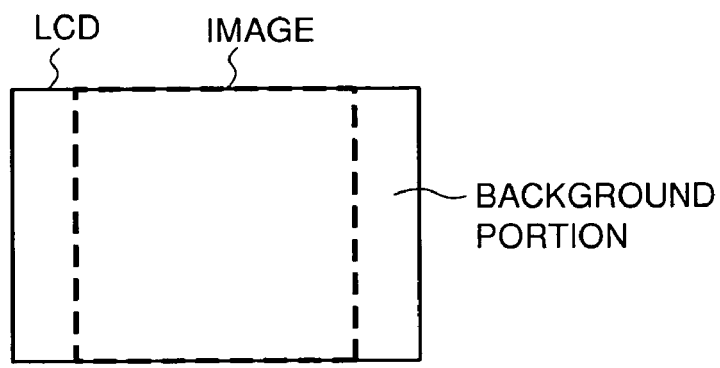
FIGS. 9A and 9B are explanatory diagrams of an image to which a background color is given.
Figure 9B:
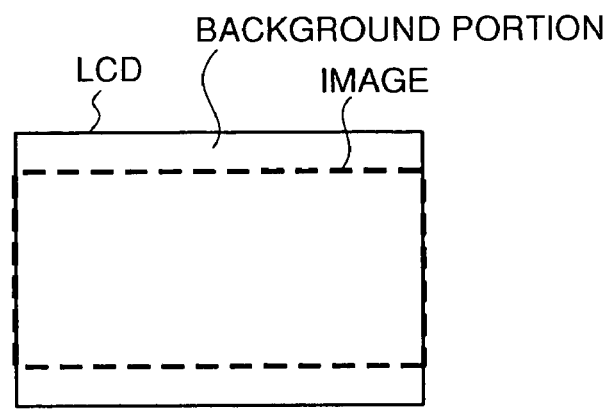

When the CPU 28 outputs the image data to the projector 1 (step S19), an image with a specific background color given on the right and left sides of the image is displayed on the LCD as shown in FIG. 9A when (X1/Y1)<(X2/Y2). When (X1/Y1)>(X2/Y2), an image with a specific background color given on the top and bottom sides of the image is displayed on the LCD as shown in FIG. 9B.

Figure 10:
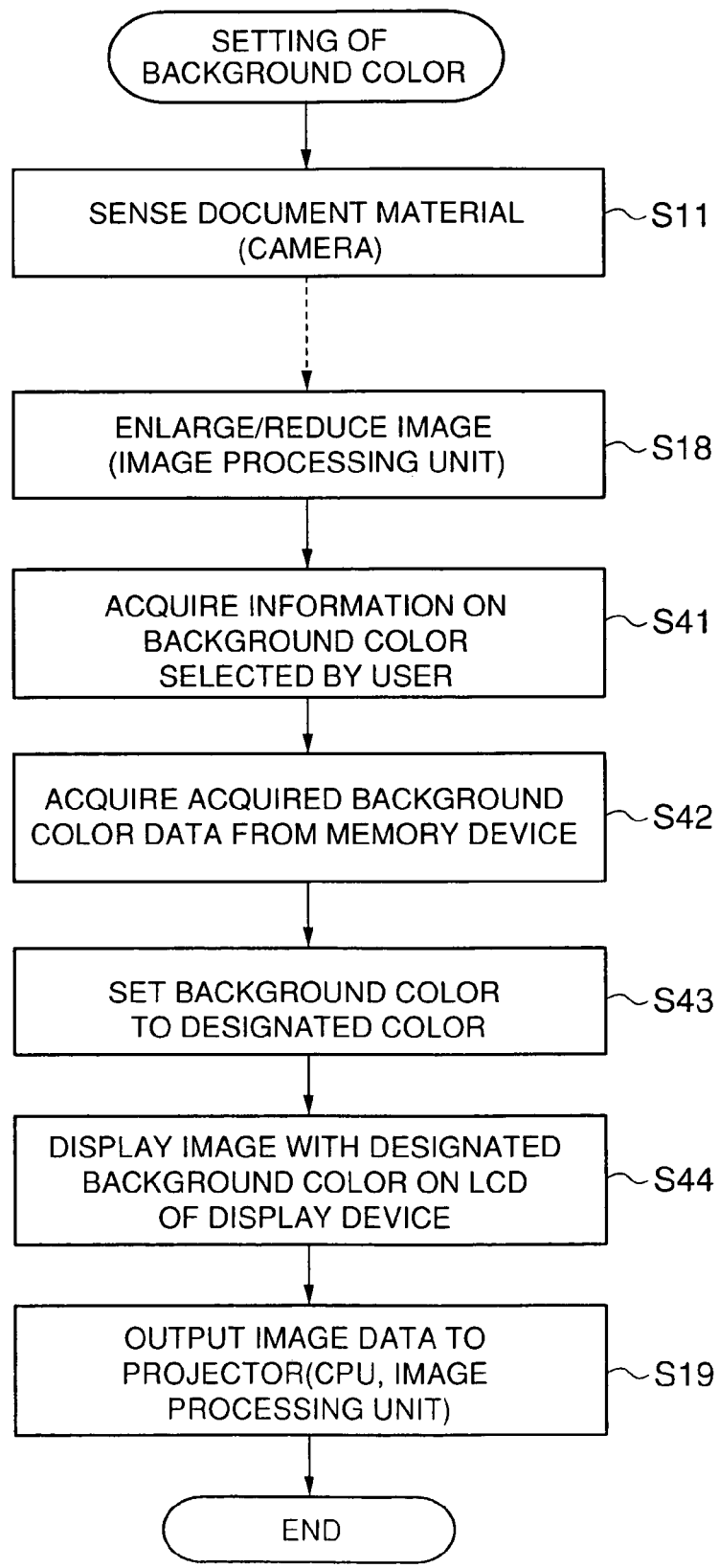
FIG. 10 is a flowchart illustrating the contents of a process of the computer shown in FIG. 1 of setting the background color to a designated color.

The display color of the background portion can be set to a color designated by a user. A flowchart for a routine for this color setting is illustrated in FIG. 10.

After the image processing unit 22 enlarges or reduces an image (step S18), the CPU 28 acquires information on the background color like black or blue selected by the user (step S41).

The CPU 28 acquires data on the background color like black or blue from the memory device 23 (step S42).

The CPU 28 sets the background color to the designated color based on the data acquired from the memory device 23 (step S43).

The CPU 28 sends the data with the designated background color to the display device 24 which in turn displays an image with the background color on the LCD (step S44).

When the CPU 28 outputs the image data to the projector 1 (step S19), an image provided with the background color designated by the user on the right and left sides or the top and bottom sides as shown in FIG. 9A or 9B is displayed on the LCD.

In the embodiment, the CPU 28 compares the aspect ratio of the image of the document material A with the aspect ratio of the monitor display frame, then discriminates the side of the image which corresponds the LCD and sets the magnification m based on the comparison result. However, the process may be executed by the image processing unit 22.

Figure 11:
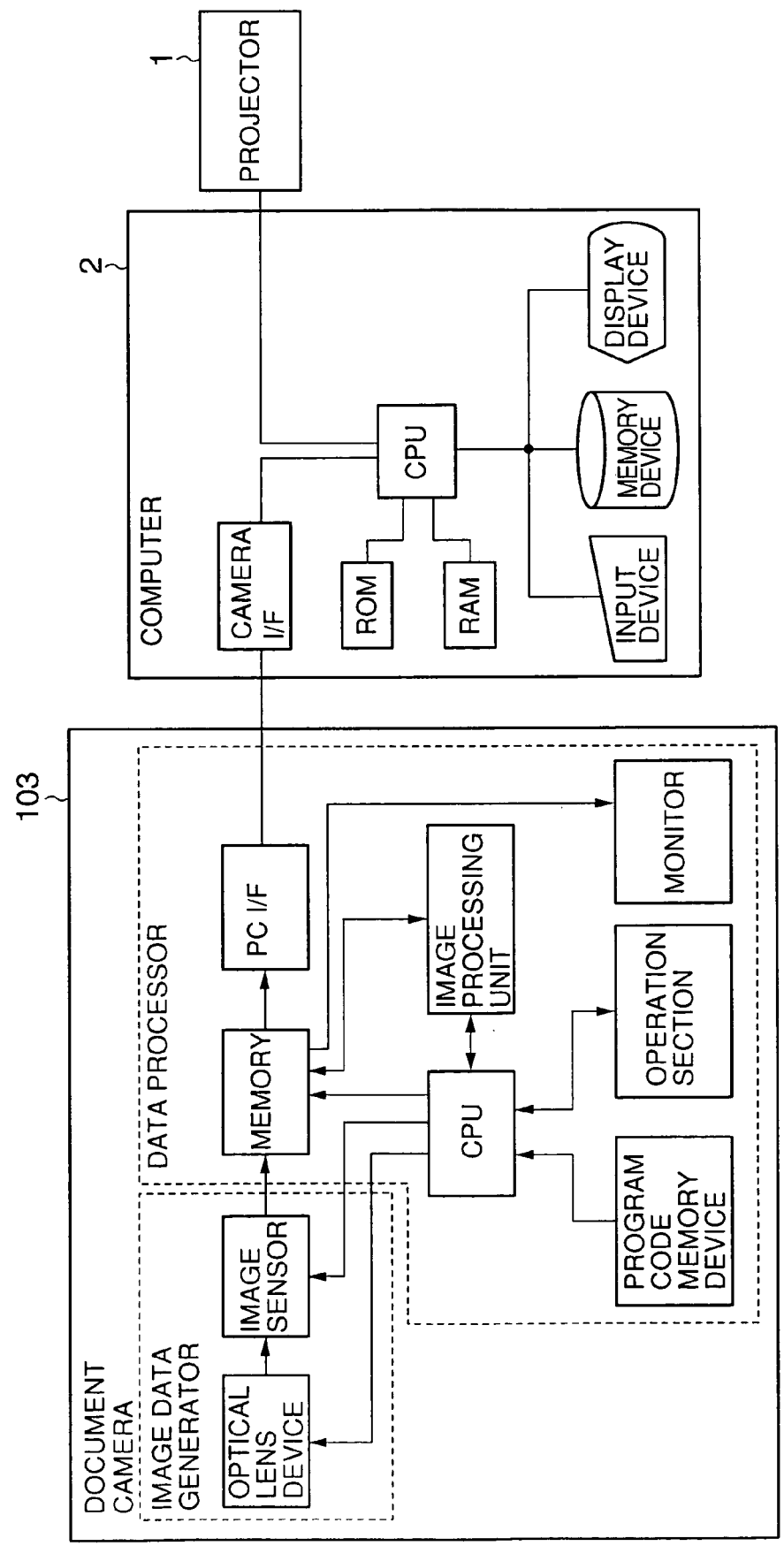
FIG. 11 is a diagram showing the structure of another embodiment equipped with an image processing unit, a CPU and a camera 103.
Figure 12:
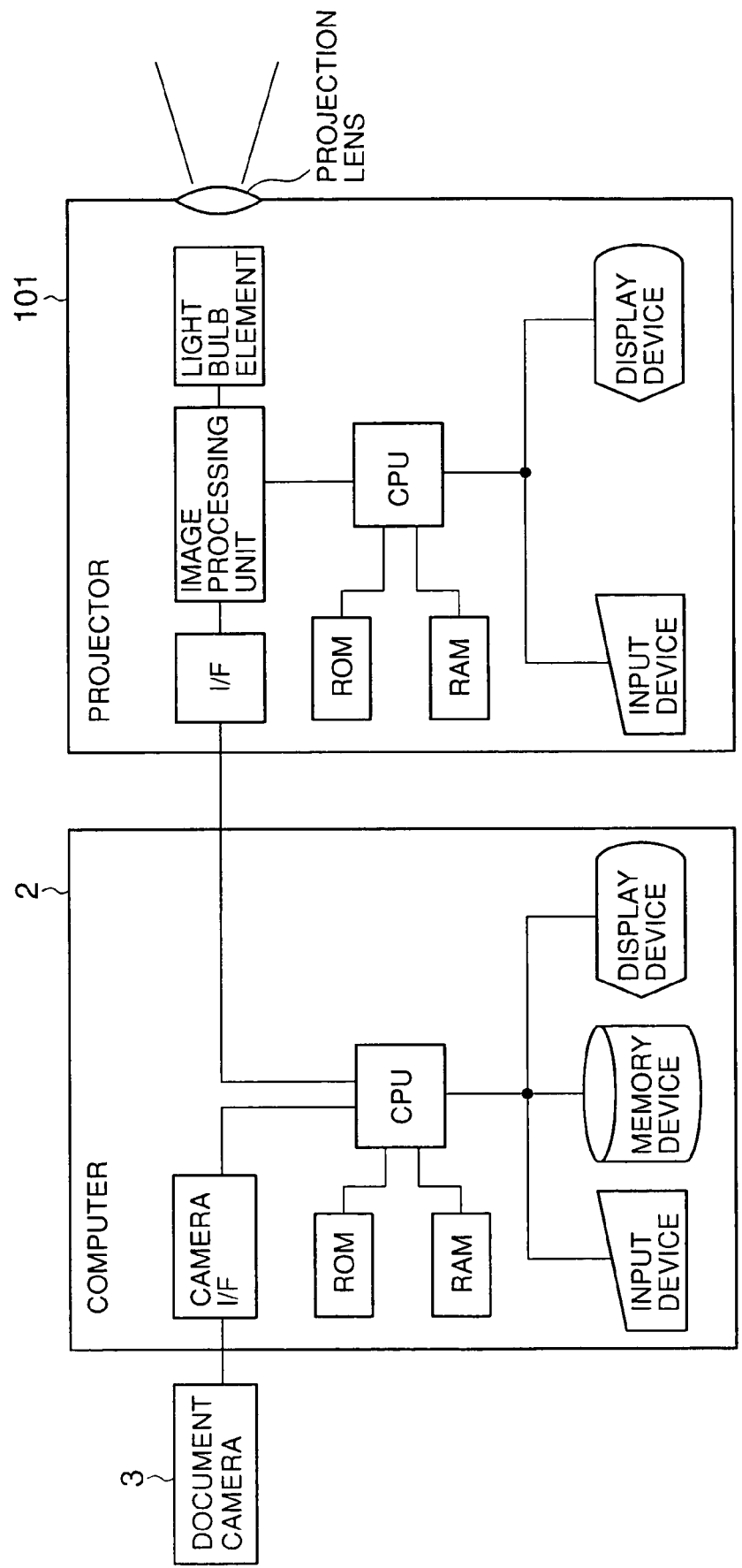
FIG. 12 is a diagram showing the structure of a further embodiment equipped with an image processing unit, a CPU and a projector 101.

In the embodiment, the computer 2 has the image processing unit 22, the CPU 28, etc. Instead, a document camera 103 may be so constructed as to have the capabilities of the image processing unit 22, the CPU 28 and so forth as shown in FIG. 11, or the projector 1 may be so constructed as to have the capabilities of the image processing unit 22, the CPU 28 and so forth as shown in FIG. 12. In this case, the image processing unit, the CPU, etc. which are provided in the camera or the projector perform operations similar to those of the embodiment discussed above.

The sensed image projection apparatus may be constructed by the projector 1 and the document camera 3 alone, thus eliminating the computer 2. In this case, the document camera 3 or the projector 1 is so constructed as to have the image processing unit 22, the CPU 28 and so forth.

In other words, the image processing unit 22, the CPU 28 and so forth in the sensed image projection apparatus can achieve functions similar to those of the above-described embodiment as long as the components are present in any of a series of image data flows from the image sensing point to the image projecting point.

A projection target has been described as an original or a document of a fixed size in the foregoing description of the embodiment. However, the projection target is not limited to a document but may be a two-dimensional object or a three-dimensional object of any shape.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-341861 filed on Sep. 30, 2003 and including specification, claims, drawings and summary. The disclosure of the above Japanese Patent Application is incorporated herein by reference in its entirety.

What is claimed is:

1. A camera for use in a sensed image projection system for projecting an image of a sensed projection target onto a screen, comprising:
   an image pickup lens;
   a sensing element;
   an image processing unit which: (i) discriminates a sheet portion of a document as the projection target from a whole image via the image pickup lens and the sensing element, (ii) extracts the discriminated projection target from the whole image, (iii) enlarges or reduces the image of the projection target by a magnification or reduction at which one of a vertical size and a horizontal size of the image of the projection target corresponds to a predetermined shape of an image projection frame of the screen, and (iv) adds a background color to a margin produced between the enlarged or reduced image of the projection target and the image projection frame of the screen, in such a way that the image of the projection target is entirely displayed within the predetermined shape; and
   an output unit which outputs an image subjected to image processing by the image processing unit as an image to be projected onto the screen.

2. The camera according to claim 1, wherein the image of the projection target is the projection target extracted from the whole image, sensed by the image pickup lens and the sensing element, by the image processing unit.

3. The camera according to claim 1, further comprising:
   a monitor with a display shape corresponding to the predetermined shape;
   a discrimination unit which compares a ratio of the vertical size of the image of the projection target to the horizontal size thereof with an aspect ratio of the display shape of the monitor, and discriminates a direction of the image of the projection target corresponding to the display shape of the monitor based on a comparison result; and
   a magnification setting unit which sets the magnification or reduction based on a ratio of a length of the image of the projection target in the direction that is discriminated to correspond to the display shape by the discrimination unit to a length of a corresponding side of the display shape, whereby the image processing unit enlarges or reduces the image of the projection target by the magnification or reduction set by the magnification setting unit.

4. The camera according to claim 3, wherein the magnification setting unit sets the magnification or reduction in such a way that one of the vertical size and the horizontal size of the image of the projection target matches with the display shape or one of the vertical size and the horizontal size of the image of the projection target becomes smaller than the display shape.

5. The camera according to claim 1, wherein the image processing unit performs image processing in such a way that the enlarged or reduced image of the projection target is laid out to be displayed in a vicinity of a center of the predetermined shape.

6. The camera according to claim 1, wherein the image processing unit sets a preset color or a color designated by a user as the background color for the margin produced between the enlarged or reduced image of the projection target and the image projection frame of the screen.

7. A computer for use in a sensed image projection system, comprising:
- an input unit to which an image obtained by sensing a projection target is input;
- an image processing unit which: (i) discriminates a sheet portion of a document as the projection target from a whole image picked up by a camera, (ii) extracts the discriminated projection target from the whole image, (iii) enlarges or reduces the image of the projection target by a magnification or reduction at which one of a vertical size and a horizontal size of the image of the projection target corresponds to a predetermined shape of an image projection frame, and (iv) adds a background color to a margin produced between the enlarged or reduced image of the projection target and the image projection frame of the screen, in such a way that the image of the projection target is entirely displayed within the predetermined shape; and
- a control unit which outputs an image subjected to image processing by the image processing unit to a projection unit for projecting the image.

8. The computer according to claim 7, wherein the image of the projection target is the projection target extracted from a whole image, sensed by an image sensing device of the camera, by the image processing unit.

9. The computer according to claim 8, further comprising:
- a discrimination unit which compares a ratio of the vertical size of the image of the projection target to the horizontal size thereof with an aspect ratio of the predetermined shape, and discriminates a direction of the image of the projection target corresponding to the predetermined shape based on a comparison result; and
- a magnification setting unit which sets the magnification or reduction based on a ratio of a length of the image of the projection target in the direction that is discriminated to correspond to the predetermined shape by the discrimination unit to a length of a corresponding side of the predetermined shape, whereby the image processing unit enlarges or reduces the image of the projection target by the magnification or reduction set by the magnification setting unit.

10. The computer according to claim 9, wherein the magnification setting unit sets the magnification or reduction in such a way that one of the vertical size and the horizontal size of the image of the projection target matches with the predetermined shape or one of the vertical size and the horizontal size of the image of the projection target becomes smaller than the predetermined shape.

11. The computer according to claim 8, wherein the image processing unit performs image processing in such a way that the enlarged or reduced image of the projection target is laid out to be displayed in a vicinity of a center of the predetermined shape.

12. The computer according to claim 8, wherein the image processing unit sets a preset color or a color designated by a user as the background color for the margin produced between the enlarged or reduced image of the projection target and the image projection frame of the screen.

13. A projector for use in a sensed image projection system for projecting an image of a sensed projection target onto a screen, comprising:
- a projection lens;
- a light bulb which forms an image;
- an interface to which image data is input; and
- an image processing unit which: (i) discriminates a sheet portion of a document as the projection target from a whole image picked up by a camera, (ii) extracts the discriminated projection target from the whole image, (iii) enlarges or reduces the image of the projection target by a magnification or reduction at which one of a vertical size and a horizontal size of the image of the projection target corresponds to a predetermined shape of an image projection frame of the screen, and (iv) adds a background color to a margin produced between the enlarged or reduced image of the projection target and the image projection frame of the screen, in such a way that the image of the projection target input from the interface is entirely displayed within the predetermined shape, whereby an image subjected to image processing by the image processing unit is projected onto the screen by the light bulb and the projection lens.

14. The projector according to claim 13, wherein the image of the projection target is the projection target extracted from the whole image input from the interface by the image processing unit.

15. The projector according to claim 13, further comprising:
- a discrimination unit which compares a ratio of the vertical size of the image of the projection target to the horizontal size thereof with an aspect ratio of the predetermined shape, and discriminates a direction of the image of the projection target corresponding to the predetermined shape based on a comparison result; and
- a magnification setting unit which sets the magnification or reduction based on a ratio of a length of the image of the projection target in the direction that is discriminated to correspond to the predetermined shape by the discrimination unit to a length of a corresponding side of the predetermined shape, whereby the image processing unit enlarges or reduces the image of the projection target by the magnification or reduction set by the magnification setting unit.

16. The projector according to claim 15, wherein the magnification setting unit sets the magnification or reduction in such a way that one of the vertical size and the horizontal size of the image of the projection target matches with the predetermined shape or one of the vertical size and the horizontal size of the image of the projection target becomes smaller than the predetermined shape.

17. The projector according to claim 13, wherein the image processing unit performs image processing in such a way that the enlarged or reduced image of the projection target is laid out to be displayed in a vicinity of a center of the predetermined shape.

18. The projector according to claim 13, wherein the image processing unit sets a preset color or a color designated by a user as the background color for the margin produced between the enlarged or reduced image of the projection target and the image projection frame of the screen.

19. An image processing method for performing image processing on an image of a projection target to be projected onto a screen, comprising:
- setting a magnification or reduction at which one of a vertical size and a horizontal size of the image of the projection target corresponds to a predetermined shape corresponding to an image projection frame of the screen, in such a way that the image of the projection target is entirely displayed within the predetermined shape;
- discriminating a sheet portion of a document as the projection target from a whole image picked up by a camera;
- extracting the discriminated projection target from the whole image;

enlarging or reducing the image of the projection target by the set magnification or reduction; and adding a background color to a margin produced between the enlarged or reduced image of the projection target and the image projection frame of the screen.

20. A computer-readable recording medium having a computer program stored thereon that is executable by a computer to control the computer to perform image processing on an image of a projection target to be projected onto a screen, said image processing comprising:

setting a magnification or reduction at which one of a vertical size and a horizontal size of the image of the projection target corresponds to a predetermined shape corresponding to an image projection frame of the screen, in such a way that the image of the projection target is entirely displayed within the predetermined shape;

discriminating a sheet portion of a document as the projection target from a whole image picked up by a camera;

extracting the discriminated projection target from the whole image;

enlarging or reducing the image of the projection target by the set magnification or reduction; and adding a background color to a margin produced between the enlarged or reduced image of the projection target and the image projection frame of the screen.

* * * * *